United States Patent [19]

Hamilton

[11] Patent Number: 5,428,662
[45] Date of Patent: Jun. 27, 1995

[54] DETECTING MAKE-BREAK CLICKS ON A TELEPHONE LINE

[75] Inventor: Chris A. Hamilton, Montclair, N.J.

[73] Assignee: Dialogic Corporation, Parsippany, N.J.

[21] Appl. No.: 24,613

[22] Filed: Mar. 1, 1993

[51] Int. Cl.⁶ .......................... H04M 1/24; H04M 3/00
[52] U.S. Cl. ........................... 379/24; 379/26; 379/377; 379/386
[58] Field of Search ............ 379/24, 26, 286, 377, 379/378, 379, 380, 386

[56] References Cited

U.S. PATENT DOCUMENTS

| | | | |
|---|---|---|---|
| 4,122,308 | 10/1978 | Weinberger | 379/132 |
| 4,405,833 | 9/1983 | Cave | 379/34 |
| 4,839,920 | 6/1989 | Held-Elbert | 379/286 |
| 4,924,501 | 5/1990 | Cheeseman | 379/286 |
| 4,944,001 | 7/1990 | Kizuik | 379/386 |
| 5,251,256 | 10/1993 | Crowe | 379/377 |

Primary Examiner—Stephen Chin
Assistant Examiner—Vijay Shankar
Attorney, Agent, or Firm—Michael B. Einschlag

[57] ABSTRACT

Method and apparatus for detecting make-break clicks on a telephone line, i.e., clicks produced by going on-hook or off-hook. A click is detected by analyzing time slices of a telephone signal to detect a sharp positive transition in signal energy followed by a diminishing envelope of short duration. Three signal measures are utilized to determine whether a click has occurred: (a) a magnitude transition, i.e., a change of the magnitude of the amplitude of the signal over a short period of time; (b) a peak magnitude, i.e., a magnitude of the amplitude of the signal corresponding to the first acceptably large magnitude transition (the beginning of the click); and (c) a duration of the signal envelope. In accordance with the present invention: (a) the minimum allowable peak magnitude of a valid click is scaled to the maximum magnitude encountered as the telephone signal is analyzed, i.e., a start-of-click adaptive amplitude measure, and (b) the end of the click is determined by comparing the magnitude of the amplitude of the signal with a maximum allowable magnitude for silence which is scaled to the maximum magnitude encountered since the last click ended, i.e., an end-of-click adaptive amplitude measure.

19 Claims, 7 Drawing Sheets

TYPICAL CLICK

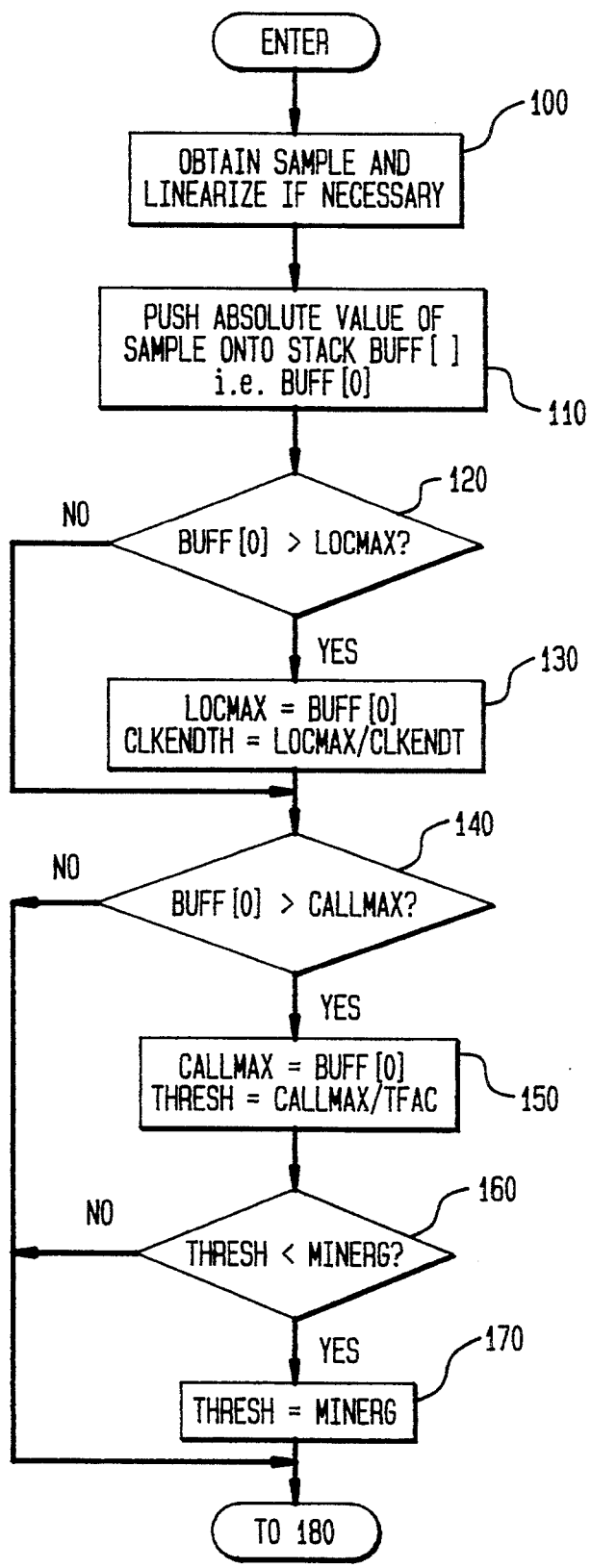
FIG 4A1

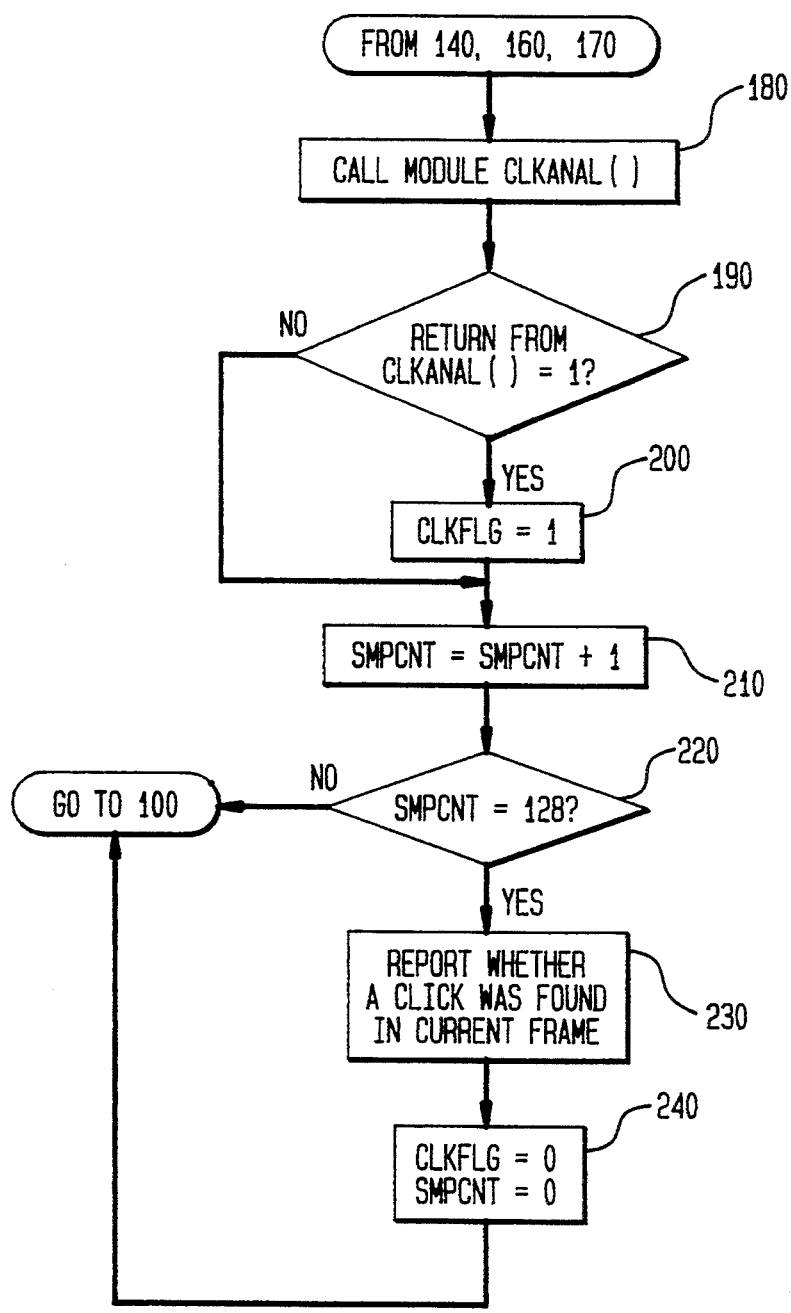
FIG. 4A2

DETECTING MAKE-BREAK CLICKS ON A TELEPHONE LINE

TECHNICAL FIELD OF THE INVENTION

The present invention pertains to the field of telephony and, in particular, to method and apparatus for detecting clicks within an audio signal transmitted over a telephone line.

BACKGROUND OF THE INVENTION

It is known in the art that audio clicks or impulses are a normal feature of analog signals transmitted over a telephone network. As is known, such clicks arise from a variety of sources such as: (a) opening or closing of a loop current circuit, typically caused by answering or hanging up a telephone, or dialing pulse digits from a rotary dial telephone and the like and (b) non-specific noise impulses.

As is known, the step of making or breaking loop current between a telephone unit and a telephone central office (CO) is typically discontinuous and causes a step function perturbation of the loop current signal. Further, a number of linear and nonlinear phenomena may interact with the step function perturbation between the telephone unit and the CO as well as within the CO to produce a click which is transmitted throughout the telephone network. In fact, perhaps the most important such interaction which produces a click is an interaction of the loop current signal with an approximately 300 Hz hi-pass filter at the CO. This filter has the effect of rapidly removing dc components of the loop current signal and of passing only the edge of the step function along with some trailing oscillations, all of which appear at the output of the CO. This output signal is the click and FIG. 1 shows a typical click which is produced whenever a telephone line is answered by a telephone unit going off-hook.

It is known in the art that automated systems have been developed for use in telecommunications applications wherein the automated systems will place and/or receive telephone calls for the purpose, for example, of connecting a business agent at one end with a member of the public at the other end. Further, it is also known in the art that during such calls it is often necessary for the telecommunications application to require interaction with the member of the public. Where the member of the public utilizes a rotary dial telephone or the like to carry out this interaction, clicks are generated, which clicks are transmitted to the telecommunications application where they must be detected in order for the telecommunications application to carry out the interaction properly.

In light of this, there is need in the art for method and apparatus for detecting clicks caused by answering or hanging up a telephone or by dialing pulse digits from a rotary dial telephone and the like while avoiding false detection of click-like components of speech or other signals not associated with loop current transitions.

SUMMARY OF THE INVENTION

Embodiments of the present invention advantageously solve the above-identified need in the art by providing method and apparatus for detecting clicks caused by, for example, the following two types of activities: (a) answering or hanging up a telephone or (b) dialing pulse digits from a rotary dial telephone and the like, while avoiding false detection of click-like components of speech or other signals not associated with loop current transitions. I have determined that clicks produced as a result of the above described two types of activities are similar and, advantageously, embodiments of the method and apparatus of the present invention detect clicks produced by either of these two types of activities.

In accordance with the present invention, a click is detected by analyzing time slices of a telephone signal to detect a sharp positive transition in signal energy followed by a diminishing envelope of short duration. Further, line noise spikes which are usually lower in energy than make-break clicks, i.e., clicks which are produced by going on or off hook, are ignored by imposing minimum energy thresholds for detection. Still further, embodiments of the present invention avoid false detection of click-like components of speech or other signals not associated with loop current transitions.

In particular, a click detector fabricated in accordance with the present invention for detecting a click in a telephone signal comprises: (A) amplitude sampler means (responsive to the telephone signal) for obtaining a measure of the magnitude of an amplitude of the telephone signal; (B) controller means: (i) (responsive to the measure from the amplitude sampler means) (a) for storing the measure in a storage means and (b) for sending a signal to a magnitude adaptor means for determining adaptive measures of the telephone signal and for storing the adaptive measures in the storage means; (ii) (responsive to the measure from the amplitude sampler means) for determining a measure of length of time the input signal has been received; (iii) (responsive to "inside click" information stored in the storage means) for sending a signal to a magnitude jump detector means if the "inside click" information indicates a start of a click has not been detected and, if the "inside click" information indicates the start of a click has been detected, (a) for determining a measure of the length of a click and for storing the measure of the length in the storage means and (b) for sending a signal to a silence detector; and (iv) (responsive to the measure of length of time and to "click detected" information obtained from the storage means) for generating a signal which indicates whether a click was detected during a predetermined length of time; wherein the magnitude jump detector is apparatus (responsive to measures and adaptive amplitude measures obtained from the storage means) for detecting an increase and a rate of increase in signal amplitude and for storing "inside click" information in the storage means; the silence detector is apparatus (responsive to measures, adaptive amplitude measures, and the length measure obtained from the storage means) for: (a) detecting silence, (b) determining a measure of the length of the silence, and (c) sending a signal to an end-of-click detector; and the end-of-click detector is apparatus (responsive to the measure of the length of the silence obtained from the storage means and the signal from the silence detector) for determining the end of a click and for storing "click detected" information in the storage means.

BRIEF DESCRIPTION OF THE DRAWING

A complete understanding of the present invention may be gained by considering the following detailed description in conjunction with the accompanying drawing, in which:

FIGS. 4A–4C show a flow chart of a DSP program which forms part of the preferred embodiment shown in FIG. 3.

DETAILED DESCRIPTION

Figure 1:
FIG. 1 shows, in pictorial form, a typical click.

Embodiments of the present invention are method and apparatus for detecting make-break clicks, i.e., clicks produced by going on- or off-hook. In accordance with the present invention, a click is detected by analyzing time slices of a telephone signal to detect a sharp positive transition in signal energy followed by a diminishing envelope of short duration. Further, in accordance with the present invention, minimum energy thresholds for detection are imposed to prevent false detection of line noise spikes as make-break clicks, such line noise spikes being typically lower in energy than make-break clicks. Still further, as will be described in detail below, embodiments of the present invention advantageously avoid false detection of click-like components of speech or other signals not associated with loop current transitions.

In accordance with the present invention, three measures are utilized to determine whether a click has occurred: (a) magnitude transition, i.e., a signal comprising a click must have a measured magnitude transition greater than a predetermined minimum value; (b) peak magnitude, i.e., a signal comprising a click must have a peak magnitude greater than a predetermined minimum value; and (c) duration, i.e., a signal comprising a click must have a duration less than a predetermined maximum value. The particular values for the predetermined minimum value for magnitude transition, the predetermined minimum value for peak magnitude, and the predetermined maximum value for duration are determined from analysis of measurements of actual clicks produced by loop current transitions.

In accordance with the present invention, the magnitude transition is a measure of the change of the magnitude of the signal over a short period of time. In particular, in accordance with the preferred embodiment of the present invention, as will be described below, the magnitude transition is determined as the ratio of the output of a short-time moving average filter divided by the output of a delayed long-time moving averaging filter. Further, in accordance with the present invention, the sharper the magnitude transition, the larger the ratio.

In accordance with the present invention, the peak magnitude of a click is taken to be the magnitude of an amplitude sample of the signal corresponding to the first acceptably large magnitude transition, i.e., the magnitude of an amplitude sample corresponding to the beginning of the impulse. In general, valid click magnitudes may cover a very wide dynamic range of magnitudes, which wide range depends on the characteristics of the transmitter telephone unit, the telephone lines, the CO, and the telephone network. In fact, clicks are typically among the largest signals produced at the transmitter side. As a result, in accordance with the present invention, the predetermined minimum allowable peak magnitude of a valid click is scaled to the maximum sample magnitude encountered as the signal is analyzed, i.e., a "running maximum" is used. Advantageously, thereby, the range of the peak magnitude of a valid click can be restricted, even before a click is encountered. For example, an outgoing telephone call will usually receive a ringback signal from the telephone network before receiving an answer click generated by the called party's telephone unit going off-hook. In accordance with this aspect of the present invention, advantageously, the magnitude of the ringback is utilized to determine a suitable minimum acceptable peak magnitude for a click. For incoming telephone calls which produce dial pulse digits, in accordance with this aspect of the present invention, the first click received is used to set the minimum allowable peak magnitude of a valid click to the "running maximum" for subsequent clicks.

In accordance with the present invention, a click will be suspected of being present if the magnitude transition and the peak magnitude tests are passed. However, a positive identification of a suspected click will be validated only if the duration is below the predetermined maximum threshold. As those of ordinary skill in the art will readily appreciate, click duration is dependent on the manner in which duration is measured. A valid click always begins with a large impulse followed by a diminishing trail of oscillations. In accordance with the present invention, the end of a click is defined to occur at the amplitude sample which marks the beginning of a continuous sequence of a predetermined number of amplitude samples whose magnitude falls below a predetermined magnitude threshold.

Figure 2:
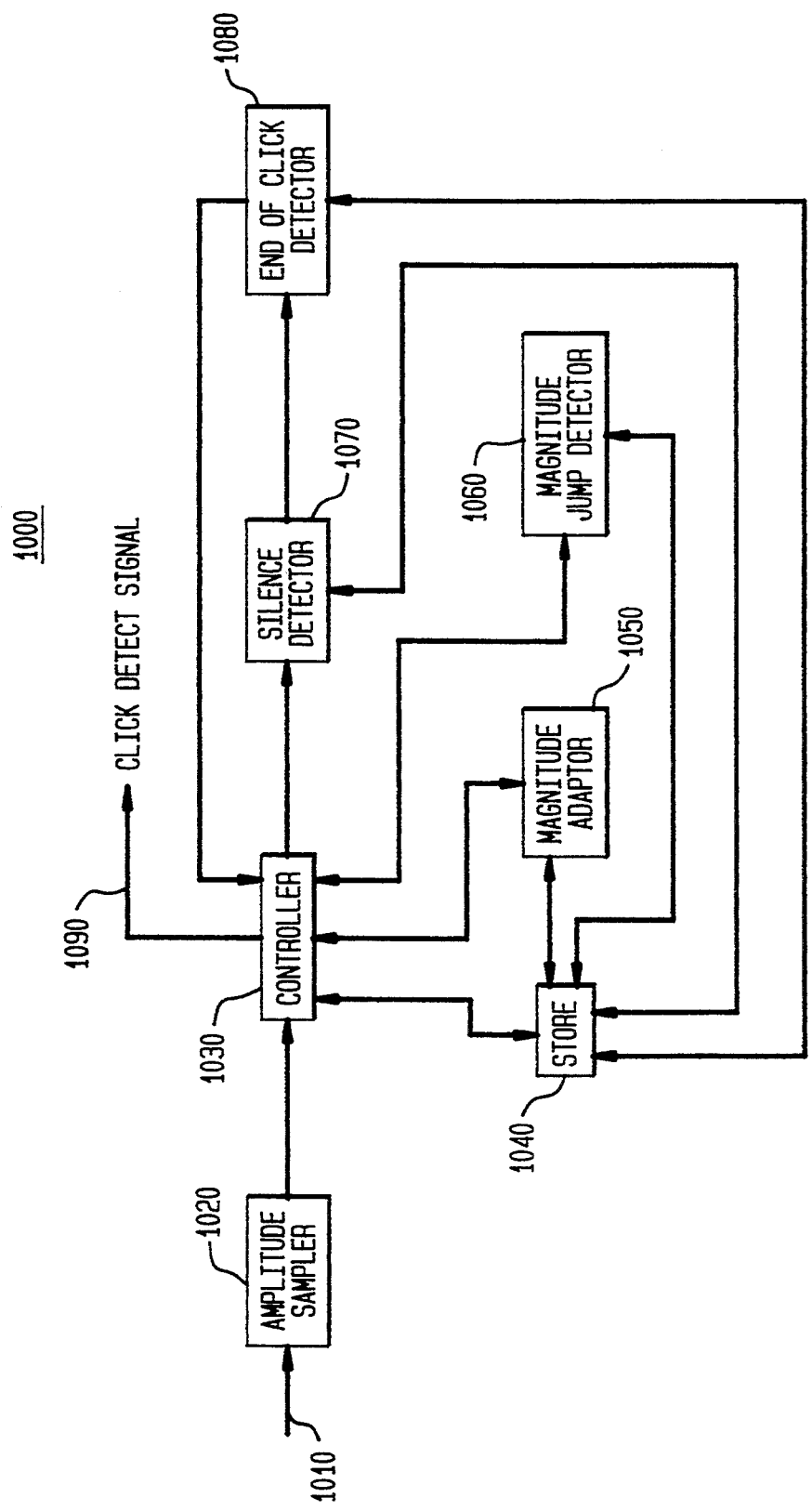
FIG. 2 shows a block diagram of an embodiment of the present invention for detecting clicks.

FIG. 2 shows a block diagram of click detector 1000 which is fabricated in accordance with the present invention. As shown in FIG. 2, analog telephone signal 1010 from a telephone network is applied as input to amplitude sampler 1020. Amplitude sampler 1020 determines a measure of the magnitude of samples of the amplitude of signal 1010. In the preferred embodiment, the measure of the magnitude is taken as the absolute value of samples of the amplitude of signal 1010. For embodiments wherein telephone signal 1010 is not an analog signal, but is instead a digital signal, embodiments of the present invention convert the digital amplitude values of the input signal into a linear pulse code modulated (PCM) digital format, if necessary. Then, in either case, amplitude sampler 1020 transfers the absolute value of the amplitude samples to controller 1030. Controller 1030 transmits the absolute value of the amplitude samples to store 1040 for storage therein and transfers control to magnitude adaptor 1050. Magnitude adaptor 1050 obtains information from store 1040 and adjusts several adaptive parameters for click detector 1000. For example, magnitude adaptor 1050: (a) determines the largest sample magnitude encountered since the last suspected click and stores it as "locmax" in store 1040; (b) scales a threshold at which to begin searching for the end of a click to "locmax" and stores the threshold as "clkendth" in store 1040; (c) determines the largest sample magnitude encountered in the current telephone call and stores it as "callmax" in store 1040; and (d) scales a threshold at which to suspect the beginning of a click to "callmax" and stores the threshold as "thresh" in store 1040. Then, magnitude adaptor 1050 transfers control back to controller 1030.

Then, controller 1030 examines flag "click" stored in store 1040 to determine which actions to follow. If, click =1, the beginning of a suspected click has been detected whereas, if click =0, no click has been detected or a click has ended. Whenever controller 1030 finds that click =0, controller 1030 transfers control to magnitude jump detector 1060. Magnitude jump detector 1060 obtains information from store 1040 and determines whether the amplitude of the input signal is above an adaptive threshold and whether there is a sharp jump in magnitude of the input signal. If both of these conditions occur, click is set =1 and stored in store 1040. Then, magnitude jump detector 1060 transfers control back to controller 1030. In response, controller 1030 increments a sample counter for purposes of keeping track of time for reporting the results of the detection analysis. Then, controller 1030 determines whether the time has been reached for reporting results. If so, a click detection signal 1090 is generated which identifies a click if flag "clkflg" has been set. Then, controller 1030 awaits the next input from amplitude sampler 1020.

Whenever controller 1030 finds that click =1, controller 1030 increments a length counter for purposes of keeping track of click length. Then, controller 1030 transfers control to silence detector 1070. Silence detector 1070 obtains information from store 1040 and determines whether the input signal represents silence by falling below adaptive threshold "clkendth" stored in store 1040. If so, silence detector increments a counter to track the length of silence. Then, silence detector 1070 transfers control to end-of-click detector 1080. End-of-click detector 1080 obtains information from store 1040 and determines whether the click has possibly ended by determining whether the silence is longer than a predetermined amount. If so, end-of-click detector 1080 determines the length of the click. Lastly, end-of-click detector 1070 determines whether a click has been detected by determining whether the length of the click is less than a predetermined amount. If so, end-of-click detector 1080 sets click detect flag "clkflg" and stores it in store 1040. Then, control is transferred back to controller 1030.

Whenever controller 1030 reaches the time for reporting results, a click detection signal 1090 is generated which identifies a click whether flag "clkflg" has been set.

Figure 3:
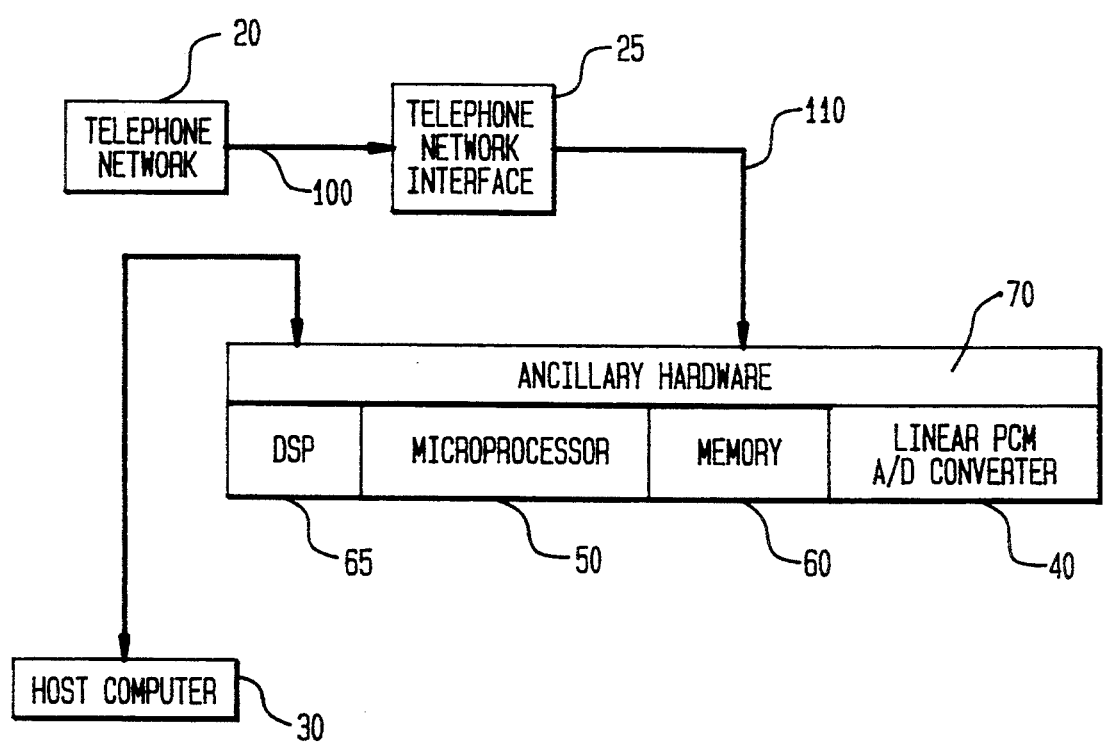
FIG. 3 shows a block diagram of a preferred embodiment of the present invention for detecting clicks which is fabricated utilizing a digital signal processor (DSP) and a microprocessor.

FIG. 3 shows a block diagram of a preferred embodiment of inventive apparatus click detector 10 (CD 10) and the manner in which it is used for detecting a click. As shown in FIG. 3, analog telephone signal 100 from telephone network 20 is transmitted by telephone network interface 25 to CD 10 as signal 110. Many apparatus for use as telephone interface 25 are well known to those of ordinary skill in the art. For example, one such apparatus comprises a portion of a DIALOG/41D Digitized Voice and Telephony Computer Interface circuit which is available from Dialogic Corporation, 300 Littleton Road, Parsippany, N.J. 07054. In pertinent part, this circuit comprises well known means for interfacing with the telephone network to send and receive calls; means, such as transformers, to electrically isolate subsequent circuits; and filter circuits.

Signal 110 which is output from telephone network interface 25 is applied as input to CD 10 and, in particular, to ancillary hardware 70. Specifically, signal 110 is applied to a sample and hold circuit (not shown) in ancillary hardware 70, embodiments of which sample and hold circuit are well known to those of ordinary skill in the art.

The output from the sample and hold circuit contained in ancillary hardware 70 is applied to mu-law, analog-to-digital converter 40. There are many circuits which are well known to those of ordinary skill in the art that can be used to embody mu-law, analog-to-digital converter 40. The encoded signal output from analog-to-digital converter 40 is placed, sample by sample, into a tri-state buffer (not shown) for subsequent transmittal to a data bus (not shown). A tri-state buffer for performing this function is well known to those of ordinary skill in the art. For example, the tri-state buffer may be a TI 74LS244 tri-state buffer which is available from Texas Instruments of Dallas, Tex., or any other such equipment.

CD 10 further comprises microprocessor 50, memory 60, digital signal processor (DSP) 65, and, optionally, a portion of ancillary hardware 70 for use in interfacing with a host computer 30. DSP 65 may be any one of a number of digital signal processors which are well known to those of ordinary skill in the art such as, for example, a Motorola 56000 processor and microprocessor 50 may be any one of a number of microprocessors which are well known to those of ordinary skill in the art such as an INTEL 80188 microprocessor which is available from INTEL of Santa Clara, Calif., or any other such equipment. Memory 60 may be any one of a number of memory equipments which are well known to those of ordinary skill in the art such as an HITACHI 6264 RAM memory which is available from HITACHI America Ltd. of San Jose, Calif., or any other such equipment. The portion of ancillary hardware 70 which interfaces with host computer 30 may be readily fabricated by those of ordinary skill in the art by using circuits which are also well known to those of ordinary skill in the art. For example, the portion of ancillary hardware 70 which interfaces with host computer 30 may be comprised of TI 74LS245 data bus transceivers, TI 74LS244 address buffers, and TI PAL 16L8 control logic, all of which is available from Texas Instruments of Dallas, Tex., or any other such equipment. Finally, as shown in FIG. 3, CD 10 interfaces with host computer 30, which may be any one of a number of computers which are well known to those of ordinary skill in the art such as, for example, an IBM PC/XT/AT, or any other such equipment.

The encoded digital samples output from linear PCM analog-to-digital encoder 40 are placed in the buffer (not shown) and are output, in turn, therefrom to the data bus (not shown). Then, the digital samples are received from the data bus, digital sample by digital sample, by microprocessor 50. Microprocessor 50, in accordance with the present invention and as will be described in detail below, places a predetermined number of digital samples on the data bus for receipt and analysis by DSP 65. The output from DSP 65 is placed on the data bus for transmittance to microprocessor 50. The output is a Boolean flag indicating whether a click was present in the last time slice of, for example, 12 ms. Microprocessor 50, in conjunction with a program and data stored in memory 60, may further analyze the click detection input, for example, to detect and identify dial pulse digits. Microprocessor 50 may then transmit such detection and identification information to host computer 30. As is well known to those of ordinary skill in the art, host computer 30 may be a part of an interactive system which is utilized to place telephone calls to members of the public and to obtain information therefrom who respond by utilizing a rotary telephone. Such systems are well known in the art and, for simplicity, their detailed operation need not be set forth here.

If input telephone signal 100 is not an analog signal, as is the case for the embodiment shown in FIG. 3, but is instead a digital signal, embodiments of the present invention convert the digital values of the input signal into a linear PCM digital format. For example, if the input digital signal values had been encoded using u-law or A-law PCM, they are converted into a linear PCM format. This conversion may be performed in either DSP 65 or microprocessor 50 in accordance with methods and apparatus which are well known to those of ordinary skill in the art such as, for example, by using a look-up table stored in memory 60. Nevertheless, in describing the inventive method and apparatus, for ease of understanding, I will refer to the linear PCM digital format samples which are output from analog-to-digital encoder 40 as digital samples.

Thus, for the embodiment shown in FIG. 3, the analog input is mu-law sampled and input into DSP 65. DSP 65 linearizes the sample, takes the absolute value of each such linearized sample, and then pushes it onto a stack. Then, the data stored in the stack are analyzed to determine whether a click has occurred.

Figure 4B:
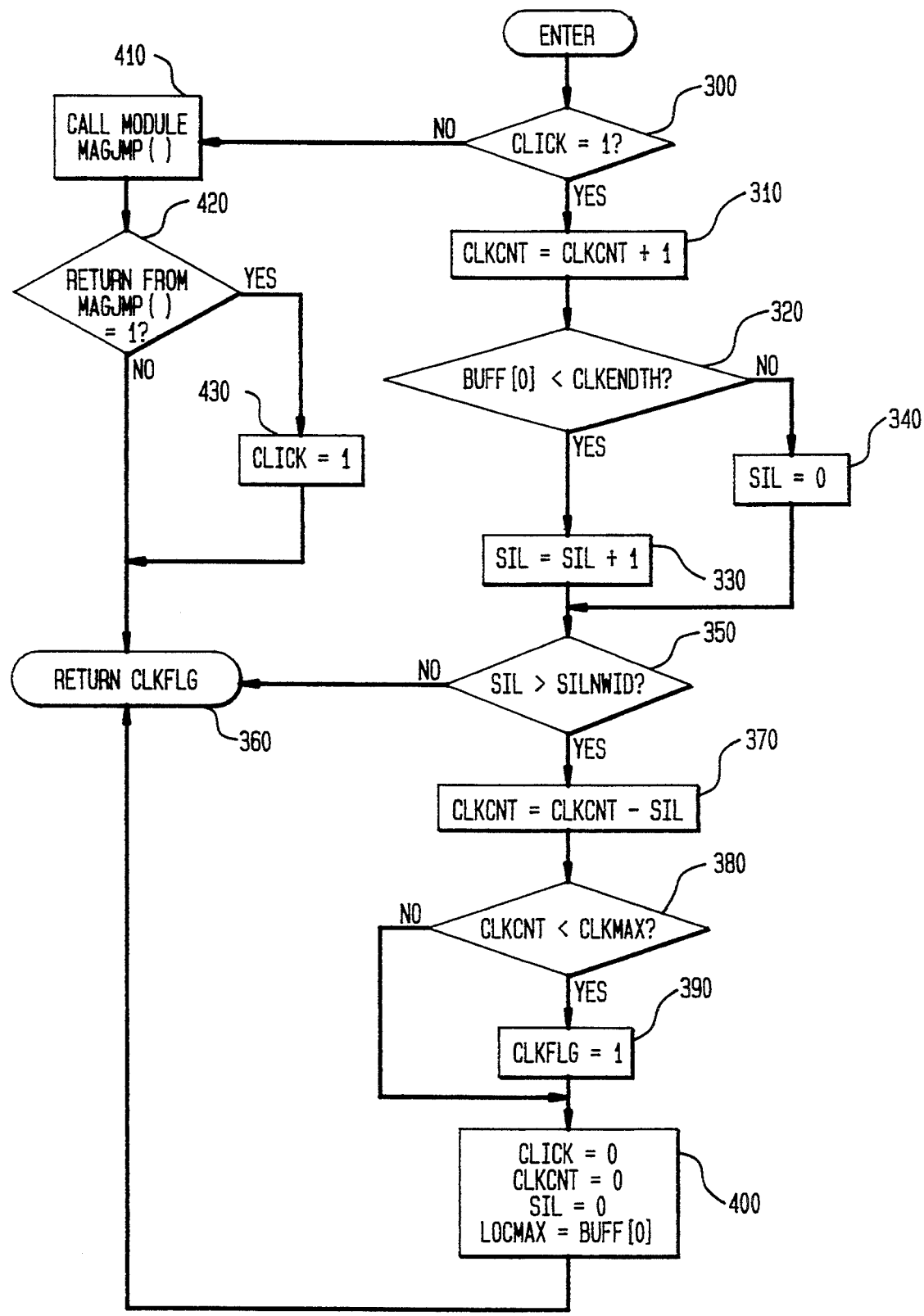
Figure 4C:
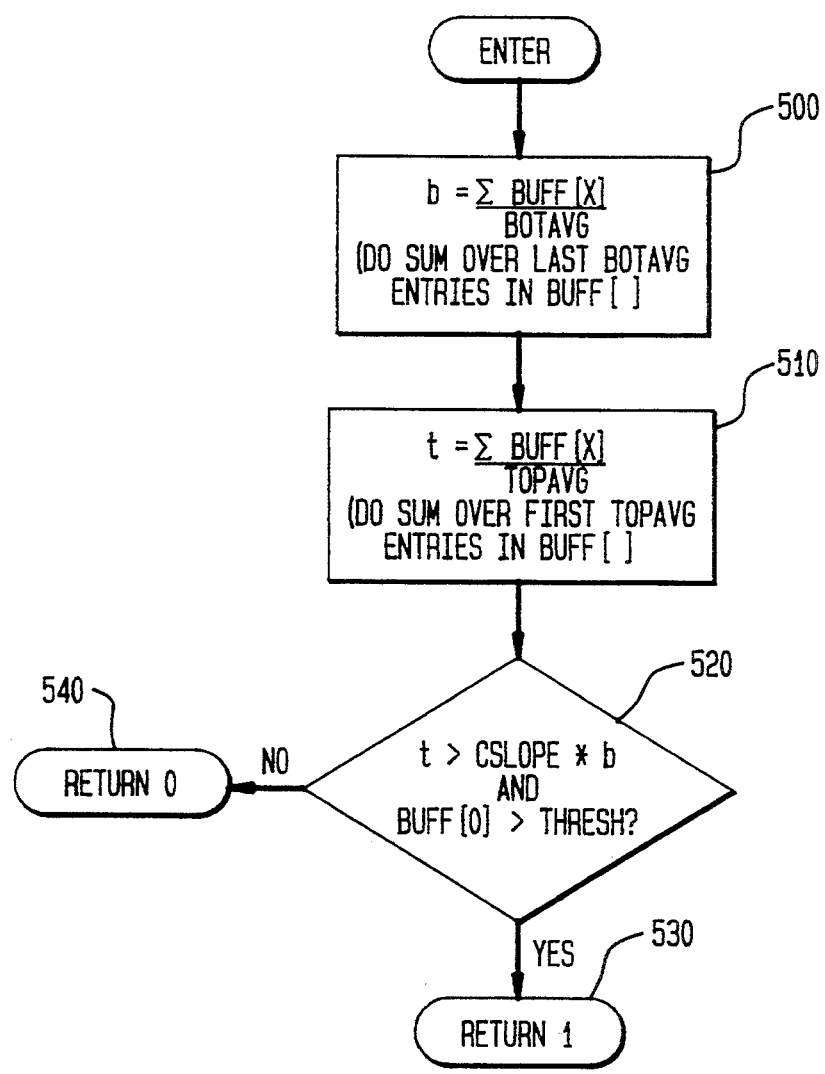

Before describing the preferred embodiment of the present invention in detail by reference to a software program which performs in accordance with the flow chart shown in FIGS. 4A–4C, I will describe the software program of DSP 65 in general to enable those of ordinary skill in the art to more easily understand the present invention.

In accordance with the present invention, the program is restarted from the beginning at the initiation of each new call, i.e., all counters and flags are initialized. The stack of sample magnitudes has a size, bufsiz, which is set equal to the sum of predetermined constants BOTAVG and DELAY. As will be discussed in detail below, predetermined constants BOTAVG and DELAY control the length and delay of the averaging filters utilized to determine the magnitude transition. The stack buff[] and output flag clkflg are initialized to zero. Flag clkflg comprises information transferred to microprocessor 50 every 12 ms, which information indicates whether or not a click was detected in the last 12 ms.

Each mu-law sample received is linearized, and the magnitude, i.e., the absolute value, of the linearized sample is pushed onto stack buff[]. The new magnitude is compared with a variable locmax, locmax contains the largest magnitude encountered since the last suspected click ended. Eventually, locmax will contain the largest sample magnitude of the next suspected click. This occurs because, if the current magnitude is greater than locmax, then locmax is updated to this value. Further, variable clkendth is scaled to locmax, clkendth is a magnitude threshold which is compared to the magnitude of a sample. If the magnitude falls below clkendth, a search is begun to seek the end of a suspected click. In accordance with the present invention, the end of the suspected click is determined to have occurred whenever the signal remains below clkendth for a predetermined number of samples, SILNWID.

If the magnitude of the current sample, buff[0], is greater than a variable callmax, then callmax is set equal to buff[0]. As a result of this, variable callmax always contains the largest sample magnitude encountered in the current telephone call; callmax is reset with each new telephone call. Further, variable thresh is set equal to callmax/TFAC whenever callmax is reset, thresh is the minimum sample magnitude required to detect the start of a suspected click. Thus, in accordance with the present invention, if the value of callmax rises, thresh will follow. If, however, the value of thresh is less than a predetermined amount MINERG, thresh is set equal to MINERG.

The samples are then analyzed by a two-state machine, i.e., function clkanal(), which resets a flag click. The flag click indicates the state of the signal, i.e., flag click is set to 1 when the beginning of a suspected click is detected and is reset to 0 at the end of the suspected click. If the last sample analyzed ends a 12 ms time frame, the value of clkflg is transferred to microprocessor 50. Initially, the value of click is 0.

Whenever two-state machine clkanal() is entered with click =0, a determination is made as to whether the current sample is the beginning of a suspected click. The necessary conditions which must occur to make the determination are: (a) the current sample magnitude must be above thresh and (b) the magnitude transition must be greater than a predetermined amount, CSLOPE. The magnitude transition is defined as the ratio between the output of a non-delayed, short-time averaging filter, t, and the output of a delayed, long-time averaging filter, b. This ratio is a measure of the current rate of increase of average sample magnitude. In accordance with the present invention the filters are FIR averaging filters, however, IIR averaging filters can be utilized as well, FIR and IIR averaging filters being well known to those of ordinary skill in the art. The length of the filters are TOPAVG and BOTAVG taps, respectively, and the delay of the long-time averaging filter is DELAY samples. If t is greater than CSLOPE*b, the magnitude of the signal is increasing very rapidly and, if buff[0] is also greater than thresh, the minimum peak magnitude for a suspected click, then the beginning of a suspected click has been detected and flag click is set to 1.

Whenever two-state machine clkanal() is entered with click =1, the current sample is inside a suspected click and clkcnt, the duration counter, is implemented. If buff[0] is less than clkendth, then the variable sil is incremented, otherwise sil is reset to 0, sil counts the number of contiguous samples less than clkendth. If sil is greater than a predetermined amount, SILNWID, then the end of the suspected click has been detected. If the end of a suspected click has been detected, then: (a) the value of clkcnt is adjusted to reflect the actual duration of the suspected click by subtracting sil from clkcnt and (b) clkcnt is compared to the constant CLKMAX. If clkcnt is less than CLKMAX, the suspected click is valid and the flag clkflg is set to 1, otherwise clkflg remains 0 and the variables clkcnt and sil and flag click are reset to 0.

With the general description set forth above in mind, the following now describes the preferred embodiment of the present invention in connection with FIGS. 4A–4C.

Whenever click detector CD 10 is activated for the first time, certain constants are given defined values which are not changed during the operation of DSP 65. Further, at the beginning of each telephone call, certain flags, buffers, and variables are initialized. In the preferred embodiment of the present invention, this occurs by invoking an initialization routine. In this initialization routine the following are set: BOTAVG =641; TOPAVG =21; DELAY =101; SILNWID =100; TFAC =3; MINERG =300; CSLOPE =10; CLKMAX =300; CLKENDT =10; clkcnt =0; thresh=MINERG; clkendth =0; locmax =0; click =0; sil =0; magflg =0; callmax =0; clkflg =0; bufsiz=BOTAVG+DELAY; buff[j] =0, for j =0 to bufsiz-1; and smpcnt =0.

Then, as each sample of the amplitude of signal 100 is received by DSP 65 in time sequence, the sample is transferred to the main processing routine whose flow chart is shown in FIG. 4A. At box 100 of FIG. 4A, the program receives the sample and converts it, if necessary, to a linear PCM digital format by means, for example, of a comparison with data stored in lookup tables in memory 60 or in a companion ROM (not shown). Then, control is transferred to box 110 of FIG. 4A.

At box 110 of FIG. 4A, the program pushes the absolute value of the sample onto stack buff[], i.e., into buff[0]. Then, control is transferred to box 120 of FIG. 4A.

At box 120 of FIG. 4A, the program determines whether buff[0] is larger than locmax. If so, control is transferred to box 130 of FIG. 4A, otherwise, control is transferred to box 140 of FIG. 4A.

At box 130 of FIG. 4A, the program resets locmax and clkendth, i.e., locmax=buff[0] and clkendth=locmax/CLKENDT. Then, control is transferred to box 140 of FIG. 4A.

At box 140 of FIG. 4A, the program determines whether buff[0] is larger than callmax. If so, control is transferred to box 150 of FIG. 4A, otherwise, control is transferred to box 180 of FIG. 4A.

At box 150 of FIG. 4A, the program resets callmax and thresh, i.e., callmax=buff[0] and thresh=callmax/TFAC. Then, control is transferred to box 160 of FIG. 4A.

At box 160 of FIG. 4A, the program determines whether thresh is less than MINERG. If so, control is transferred to box 170 of FIG. 4A, otherwise, control is transferred to box 180 of FIG. 4A.

At box 170 of FIG. 4A, the program sets thresh=MINERG. Then, control is transferred to box 180 of FIG. 4A.

At box 180 of FIG. 4A, the program calls the click analysis module clkanal(). Then, control is transferred to box 190 of FIG. 4A.

At box 190 of FIG. 4A, the program determines whether the return from module clkanal() is a 1. If so, control is transferred to box 200 of FIG. 4A, otherwise, control is transferred to box 210 of FIG. 4A.

At box 200 of FIG. 4A, the program sets clkflg=1. Then, control is transferred to box 210 of FIG. 4A.

At box 210 of FIG. 4A, the program increments sample counter smpcnt, i.e., smpcnt=smpcnt+1. Then, control is transferred to box 220 of FIG. 4A.

At box 220 of FIG. 4A, the program determines whether all of the samples for the frame have been analyzed, i.e., whether smpcnt =128. If so, control is transferred to box 230 of FIG. 4A, otherwise, control is transferred to box 100 of FIG. 4A.

At box 230 of FIG. 4A, the program reports to microprocessor 50 whether a click was found in the current frame. Then, control is transferred to box 240 of FIG. 4A.

At box 240 of FIG. 2A, the program sets clkflg=0 and smpcnt=0. Then, control is transferred to box 100 of FIG. 4A.

FIG. 4B shows a flowchart for module clkanal(). Upon entry to this module, control is transferred to box 300 of FIG. 4B. The module determines whether the frame is within a click by determining whether click=1. If so, control is transferred to box 310 of FIG. 4B, otherwise, control is transferred to box 410 of FIG. 4B.

At box 310 of FIG. 4B, the program increments the click length, i.e., clkcnt=clkcnt+1. Then, control is transferred to box 320 of FIG. 4B.

At box 320 of FIG. 4B, the program determines whether buff[0] is less than clkendth. If so, control is transferred to box 330 of FIG. 4B to count silence, otherwise, control is transferred to box 340 of FIG. 4B.

At box 330 of FIG. 4B, the program increments the silence length, i.e., sil=sil+1. then, control is transferred to box 350 of FIG. 4B.

At box 340 of FIG. 4B, buff[0] is greater than a threshold and the program sets sil=0. Then, control is transferred to box 350 of FIG. 4B.

At box 350 of FIG. 4B, the program determines whether the click has possibly ended by determining whether sil is greater than SILNWID. If so, control is transferred to box 370 of FIG. 4B, otherwise, control is transferred to box 360 of FIG. 4B.

At box 360 of FIG. 4B, module clkanal() returns with the value of flag clkflg.

At box 370 of FIG. 4B, the program determines the click length by subtracting the silence, i.e., clkcnt=clkcnt −sil. Then, control is transferred to box 380 of FIG. 4B.

At box 380 of FIG. 4B, the program determines whether the click exceeded CLKMAX, i.e., the program determines whether clkcnt is less than CLKMAX. If so, control is transferred to box 390 of FIG. 4B, otherwise, control is transferred to box 400 of FIG. 4B.

At box 390 of FIG. 4B, the click is not too long and the program sets the flag clkflg=1. Then, control is transferred to box 400 of FIG. 4B.

At box 400 of FIG. 4B, the program resets values for the next click, i.e., click=0, clkcnt=0, sil=0, and locmax=buff[0]. Then, control is transferred to box 360 of FIG. 4B.

At box 410 of FIG. 4B, the input has been silence and the program is looking for a sharp jump in signal magnitude. The program calls module magjmp(). Then, control is transferred to box 420 of FIG. 4B.

At box 420 of FIG. 4B, the program determines whether the return from module magjmp was equal to 1 which is indicative of a sharp jump in signal magnitude. If so, control is transferred to box 430 of FIG. 4B, otherwise, control is transferred to box 360 of FIG. 4B.

At box 430 of FIG. 4B, the program sets click=1. Then, control is transferred to box 360 of FIG. 4B.

FIG. 4C shows a flowchart for module magjmp(). Upon entry to this module, control is transferred to box 500 of FIG. 4C. The module determines whether there is a sharp jump in magnitude of the input signal. At box 500 of FIG. 4C, the program averages the last BOTAVG entries in buff[] and sets this average=b. Then, control is transferred to box 510 of FIG. 4C.

At box 510 of FIG. 4C, the program averages the first TOPAVG entries in buff[] and sets this average=t. Then, control is transferred to box 520 of FIG. 4C.

At box 520 of FIG. 4C, the program determines whether t is greater than CSLOPE*b and buff[0] is greater than thresh. If so, there has been a large jump in signal amplitude and control is transferred to box 530 of FIG. 4C, otherwise, there has not been a large jump in signal amplitude and control is transferred to box 540 of FIG. 4C.

At box 530 of FIG. 4C, the module returns 1 and, at box 540 of FIG. 4C, the module returns 0.

As should be clear to those of ordinary skill in the art, the embodiment of the present invention which was described in detail above is a click detector which analyzes an input signal and, in response thereto, generates a detection signal for use by another apparatus such as microprocessor 50. For example, the another apparatus can be an interactive system which can transmit voice signals to a human in the form of information and queries and can receive responses from the human in the form of various combinations of dial pulse digits which are produced, for example, by a rotary telephone set or the like. In such a system, embodiments of the present invention advantageously provide detection and identification of the clicks which may be utilized to detect and identify dial pulse digits.

Figure 5:
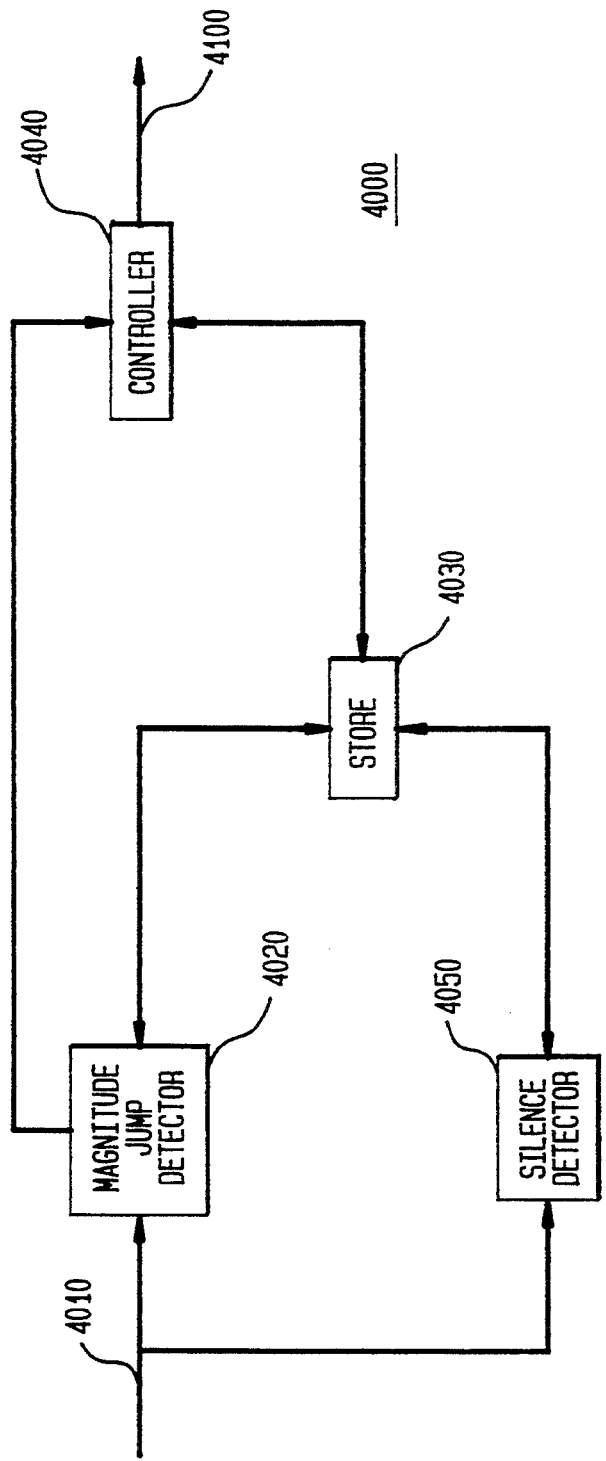
FIG. 5 shows a block diagram of another embodiment of the present invention for detecting clicks.

FIG. 5 shows a block diagram of click detector 4000 which is fabricated in accordance with the present invention. As shown in FIG. 5, telephone signal 4010 from a telephone network is applied as input to magnitude jump detector 4020 and silence detector 4050. Magnitude jump detector 4020 is apparatus which can readily be fabricated by those of ordinary skill in the art for operating in response to telephone signal 4010. For a frame, magnitude jump detector 4020: (a) obtains a measure of magnitude of an amplitude of telephone signal 4010 and stores the measures in storage means 4030, (b) determines adaptive amplitude measures of telephone signal 4010 and stores the adaptive amplitude measures in storage means 4030, (c) responsive to the measure, adaptive amplitude measures, and measures for prior frames obtained from storage means 4030, detects an increase and a rate of increase in signal amplitude to detect a start of a click and stores an indication thereof as "click begin" information in storage means 4030; and (d) transmits a signal to controller means 4040.

For a frame, silence detector 4050 is apparatus which can readily be fabricated by one of ordinary skill in the art for operating in response to telephone signal 4010. Silence detector 4050: (a) obtains an adaptive amplitude measure from storage means 4030; (b) detects silence, (b) determines a measure of length of the silence and stores it in storage means 4030, and (c) responsive to the measure of length of the silence, detects an end of a click and stores an indication thereof as "click end" in storage means 4030.

Controller means 4040 is apparatus which can be readily fabricated by those of ordinary skill in the art. In particular, controller means 4040 is apparatus, responsive to the signal from magnitude jump detector 4020 which: (a) determines a measure of length of time that measures of magnitude have been obtained and stores it in storage means 4030; (b) responsive to the "click begin" and "click end" information stored in storage means 4030, determines a measure of length of a click and stores an indication that a click is detected in storage means 4030 if the measure of length of the click is less than a predetermined length; and (c) if the measure of length of time exceeds a predetermined length of time, generates a reporting signal which indicates whether a click was detected during a predetermined length of time.

Those skilled in the art recognize that further embodiments of the present invention may be made without departing from its teachings. For example, the above embodiment may be alternatively implemented utilizing specific hardware apparatus in place of the DSP program embodiment described above.

What is claimed is:

1. A click detector for detecting a click in a telephone signal, the click detector comprising:

amplitude sampler means, responsive to the telephone signal, for obtaining measures of magnitude of amplitude of the telephone signal at various points in time;

controller means, responsive to the measures of magnitude from the amplitude sampler means:

(i) (a) for storing the measures of magnitude in a storage means and (b) for sending a magnitude-adaptor signal to a magnitude adaptor for determining a start-of-click adaptive amplitude measure and an end-of-click adaptive amplitude measure and for storing the adaptive amplitude measures in the storage means;

(ii) for determining a measure of time during a reporting interval and for storing the measure of time in the storage means;

the controller means further comprises means, responsive to click-begin information stored in the storage means, for sending a magnitude-jump signal to a magnitude jump detector if the click-begin information indicates a click start has not been detected and, if the click-begin information indicates the click start has been detected, (a) for updating a measure of click length in time and for storing the measure of click length in the storage means and (b) for sending a silence-detect signal to a silence detector;

the controller means still further comprises means, responsive to the measure of time during the reporting interval and to click-detected information stored in the storage means, for generating a click-detection signal which indicates whether a click was detected when the measure of time equals a reporting time interval length;

the magnitude adapter, responsive to the magnitude-adaptor signal, the measures of magnitude, and the start-of-click and the end-of-click adaptive amplitude measures, for updating and storing the adaptive amplitude measures in the storage means;

the magnitude jump detector, responsive to the magnitude-jump signal, measures of magnitude, and the start-of-click adaptive amplitude measure stored in the storage means, for detecting a click start by identifying an increase and a rate of increase in measure of magnitude of amplitude and for updating and storing the click-begin information in the storage means;

the silence detector, responsive to the silence-detect signal, the measures of magnitude, and the end-of-click adaptive amplitude measure stored in the storage means, for: (a) detecting silence, (b) updating a measure of length of the silence in time and for storing the measure of the length of the silence in the storage means, and (c) sending an end-of-click-detect signal to an end-of-click detector; and the end-of-click detector, responsive to the end-of-click-detect signal, the measure of click length, and the measure of length of the silence stored in the storage means, for detecting a click end click and for updating and storing the click-detected information in the storage means.

2. The click detector of claim 1 wherein the magnitude adaptor comprises means for determining: (a) a largest measure of magnitude in the telephone signal, referred to as locmax, since the end of a previous click and for scaling the end-of-click adaptive amplitude measure to locmax and (b) a largest measure of magnitude encountered in the telephone signal, referred to as callmax, and for scaling the start-of-click adaptive amplitude measure to callmax.

3. The click detector of claim 1 wherein the means for determining a measure of time during the reporting interval which comprises a portion of the controller means comprises means for counting measures of magnitude.

4. The click detector of claim 1 wherein the means for updating a measure of click length which comprises a portion of the controller means comprises means for counting measures of magnitude.

5. The click detector of claim 1 wherein the magnitude jump detector comprises means for identifying an increase in measure of magnitude by determining whether the measure of magnitude is larger than the start-of-click adaptive amplitude measure.

6. The click detector of claim 5 wherein the magnitude jump detector further comprises means for identifying a rate of increase in measure of magnitude, responsive to measures of magnitude stored in the storage means, by determining a ratio an output of a non-delayed, short-time, moving average filter divided by an output of a delayed, long-time, moving averaging filter.

7. The click detector of claim 6 wherein the silence detector comprises means for detecting silence by determining whether the measure of magnitude has fallen below the end-of-click adaptive amplitude measure.

8. The click detector of claim 7 wherein the end-of-click detector comprises means for determining whether the measure of length of the silence is larger than a predetermined amount and means for updating the measure of click length by subtracting the measure of length of the silence and for determining whether the measure of click length is less than another predetermined amount.

9. The click detector of claim 6 wherein the short-time filter and the long-time filter are FIR filters.

10. The click detector of claim 6 wherein the short-time filter and the long-time filter are IIR filters.

11. A method for detecting a click in a telephone signal, the method comprising the steps of:
obtaining a measure of magnitude of an amplitude of the telephone signal;
determining a start-of-click adaptive amplitude measure and an end-of click adaptive amplitude measure;
determining a measure of time during a reporting interval;
responsive to stored click-begin information, transferring to a magnitude jump detecting step if the click-begin information indicates a click start has not been detected and, if the click-begin information indicates the click start has been detected, (a) updating a measure of click length in time and (b) transferring to a silence detecting step;
wherein the magnitude jump detecting step comprises the steps of: responsive to a number of measures of magnitude and the start-of-click adaptive amplitude measure, identifying an increase and a rate of increase in measures of magnitude, updating the click-begin information, and transferring to a reporting step;
wherein the silence detecting step comprises the steps of: responsive to the measure of magnitude and the end-of-click adaptive amplitude measure, detecting silence, determining a measure of length of the silence, determining the end of a click, and setting click-detected information;
wherein the reporting step comprises the step of, responsive to the measure of time and the click-detected information, generating a click-detection signal which indicates whether a click was detected when the measure of time equals a reporting time interval length.

12. A click detector for detecting a click in a telephone signal, the click detector comprising:
amplitude sampler means, responsive to the telephone signal, for: (a) obtaining a measure of magnitude of an amplitude of the telephone signal and storing the measure in a storage means; (b) determining a start-of-click and an end-of-click adaptive amplitude measure and for storing the adaptive measures in the storage means; (c) determining a measure and for storing the measure of time in the storage means; (d) responsive to click-begin information stored in the storage means, sending a magnitude jump signal to a magnitude jump detector if the click-begin information indicates a click start has not been detected and, if the click-begin information indicates the click start has been detected, (i) for updating a measure of click length in time and for storing the measure of click length in the storage means; and (ii) for sending a silence-detect signal to a silence detector; and (e) responsive to the measure of time during the reporting interval and to click-detected information stored in the storage means, generating a click-detection signal which indicates whether a click was detected when the measure of time equals a reporting time interval length;
the magnitude jump detector, responsive to the magnitude jump signal, measures of magnitude, and the start-of-click adaptive amplitude measure stored in the storage means, for detecting a click start by identifying an increase and a rate of increase in measure of magnitude of amplitude and for updating and storing the click-begin information signal in the storage means;
the silence detector, responsive to the silence-detect signal, the measure of magnitude, the end-of-click adaptive amplitude measure and the measure of click length stored in the storage means, for: (a) detecting silence, (b) updating a measure of length of the silence in time and for storing the measure of the length of silence in the storage means, and (c) detecting an end of a click and for updating and storing the click-detected information in the storage means.

13. A click detector for detecting a click in a telephone signal, the click detector comprising:
magnitude jump detector, responsive to the telephone signal, for: (a) obtaining a measure of magnitude of an amplitude of the telephone signal and storing the measure in a storage means, (b) determining a start-of-click and an end-of-click adaptive amplitude measure and storing the adaptive amplitude measures in the storage means, (c) responsive to the measure, the start-or-click adaptive amplitude measure, and other measures obtained from the storage means, for identifying an increase and a rate of increase in measure of magnitude of amplitude to detect a click start and for storing an indication thereof as click begin information in the storage means; and (d) transmitting a signal to a controller means;

silence detector, responsive to the telephone signal and to the end-of-click adaptive amplitude measure stored in the storage means, for: (a) detecting silence, (b) determining a measure of length of the silence in time and for storing the measure of the length in the storage means, and (c) responsive to the measure of length of the silence, for detecting a click end and for storing an indication thereof as click-end information in the storage means;

wherein the controller means, responsive to the signal from the magnitude jump detector, comprises means for: (a) determining a measure of time during a reporting interval and for storing the measure of time in the storage means; (b) responsive to the click-begin and click-end information stored in the storage means, updating a measure of click length in time and storing an indication that the click is detected in the storage means if the measure of click length is less than a predetermined length; and (c) if the measure of time during the reporting interval exceeds a predetermined length of time, generating a click-detection signal which indicates whether a click was detected during the reporting interval.

14. A click detector for detecting a click in a telephone signal, the click detector comprising:

means for obtaining a measure of magnitude of amplitude of the telephone signal;

means, responsive to the measure of magnitude of amplitude, for determining a start-of-click and an end-of-click adaptive amplitude measure;

click-begin means, if click-begin information indicates that a click start has not been detected, for testing whether the measure of magnitude exceeds the start-of-click adaptive amplitude measure, for testing whether a rate of increase in measure of magnitude exceeds a rate-of-increase threshold, and, if the tests are satisfied, for updating the click-begin information to indicate detection of the click start; and click-end means, if the click-begin information indicates that a click start has been detected, for updating a measure of click length in time, for testing whether measures of magnitude are less than the end-of-click adaptive amplitude for predetermined length of time and, if the test is satisfied, for determining the measure of click length, and for generating a click detection signal if the measure of click length is less than a predetermined length.

15. The click detector of claim 14 wherein the means for determining the start-of-click adaptive amplitude measure comprises means for determining a largest measure of magnitude encountered in the telephone signal, referred to as callmax, and for scaling the start-of-click adaptive amplitude measure to callmax and the means for determining the end-of-click adaptive amplitude measure comprises means for determining a largest measure of magnitude in the telephone signal, referred to as locmax, since the end of a previous click and for scaling the end-of-click adaptive amplitude measure to locmax.

16. The click detector of claim 14 wherein the means for testing whether a rate of increase in measure of magnitude exceeds a rate-of-increase threshold comprises means for determining a ratio of an output of a non-delayed, short-time, moving average filter divided by an output of a delayed, long-time, moving averaging filter.

17. The click detector of claim 14 wherein the click-end means for determining the measure of click length comprises means for determining a silence measure of the length of time the measures of magnitude are less than the end-of-click adaptive amplitude and for subtracting the silence measure from the measure of click length.

18. The click detector of claim 16 wherein the short-time filter and the long-time filter are FIR filters.

19. The click detector of claim 16 wherein the short-time filter and the long-time filter are IIR filters.

* * * * *